July 19, 1932.  F. H. ROWE  1,868,177
METHOD OF MANUFACTURING WIRED GLASS
Filed Dec. 20, 1928

Inventor
Fred H. Rowe.
By James C. Hamilton.
Attorney

Patented July 19, 1932

1,868,177

UNITED STATES PATENT OFFICE

FRED H. ROWE, OF GLOUCESTER, MASSACHUSETTS, ASSIGNOR TO THE CLEAR VIEW WIND SHIELD COMPANY, OF BOSTON, MASSACHUSETTS, A CORPORATION OF MASSACHUSETTS

METHOD OF MANUFACTURING WIRED GLASS

Application filed December 20, 1928. Serial No. 327,407.

My present invention relates to the manufacture of wired glass and more particularly to that improved method of producing a wired glass in which the wire is of the resistance type and may be electrically heated and thereby heat the glass itself.

Heretofore wired glass has been used principally for its safety characteristics in case of breakage, but in my present invention the principal object of the wire is for heating purposes.

One of the difficulties encountered in using ordinary wired glass for heating purposes is that if an electric current be passed through the wire as enclosed in the present wired glass, assuming such wire was of the resistance requirements necessary, the expansion which would result in the wire when energized would crack the glass because of the close surface contact between such wire and glass. One of the incidental uses of an electrical resistance wired glass is in the production of automobile wind-shields, the heating of which eliminates ice coating in the winter time; accumulation of moisture on the inside under certain humidity conditions. In an automobile wind-shield the wires need not be closer than an inch and one half horizontal spacing, and the diameter of the wire is so small that practically no obstruction to the vision is encountered; another application of this type of glass is in windows of ships, as in the pilot house; airplanes, and many other uses too numerous to mention. In the production of such a product it is necessary to provide a cavity for the wire which will be a few thousandths of an inch larger than the wire when cold, otherwise the expansion of the wire when heated will crack the glass, as would be the case in the present method of manufacturing wired glass in which close contact is desired.

The principal object therefore is to produce a cavity for the wire which will be sufficiently oversized to accommodate such wire when expanded by electrical heat generated by a storage battery, electric generator, or other similar means. In order to produce such a condition I have discovered that by charging such wire with the proper voltage prior to pouring the glass, and the maintenance of such voltage until after the molten glass has become set about the wire, the proper clearance will be provided around the wire when it is desired to heat such glass in a windshield or similar device.

Figure 1:
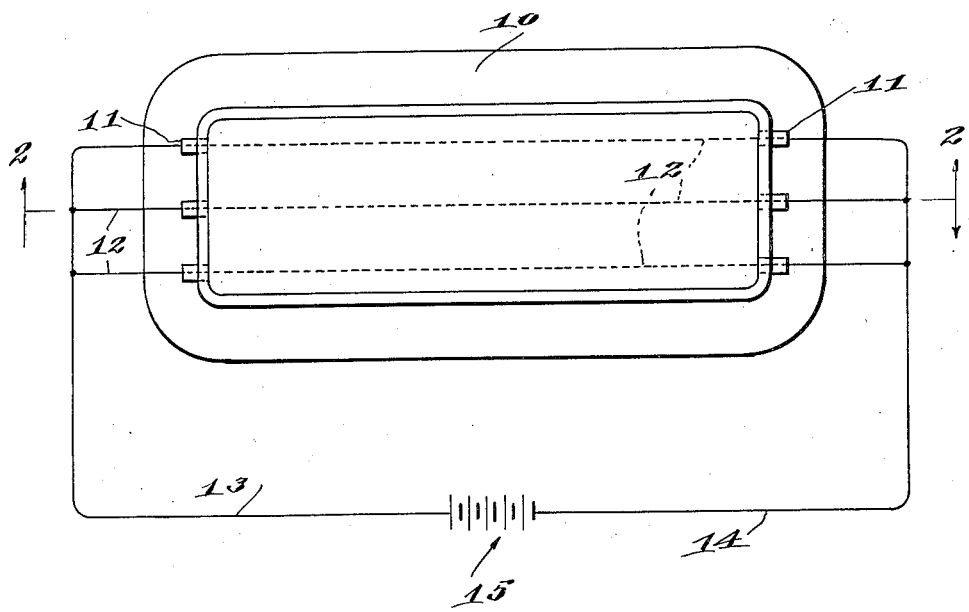
Figure 2:
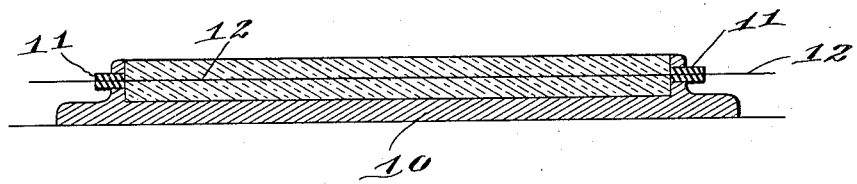

To better illustrate my invention I have shown in a more or less diagrammatic form a mold for producing such a wired glass in which, Fig. 1 is a plan view of such a mold, and
Fig. 2 is a cross section taken on the line 2—2 of Fig. 1.

Referring to the drawing, 10 indicates a mould of any convenient type in which removable insulators 11 may be inserted at the two opposite sides thereof for the purpose of supporting in a horizontal plane a series of parallel spaced wires 12. The ends of the wires 12 may be connected by common carrier wires 13 and 14 to an electrical power supply such as a battery 15. In producing the glass, the molten glass is poured into the mould while the wires are heated to a temperature above that at which the molten glass solidifies and the heat is maintained constant until the glass has become cooled sufficiently to acquire a solidified character, after which the current is cut off from the wires 12, the insulators 11 are removed prior to removing the glass from the mould. Any suitable insulating means may be used in practice for mounting and connecting the wires when placed in commercial use. The particular mode of connection depending upon the circumstances under which the glass is to be used.

Having thus described my invention, what I claim as new is:

1. That improved method in the art of manufacturing wired glass which consists in pouring molten glass about a wire expanded by electrical energy, said wire being maintained at a temperature above the solidification point of the molten glass until said glass has fully solidified.

2. That improved method in the art of manufacturing wired glass which consists in superimposing a series of wires in a mould, charging such wires with electricity for the purposes of expansion and maintaining such expansion of said wires at a temperature greater than that at the freezing point of glass while molten glass is poured around same and allowed to solidify.

3. That improved method of moulding glass around resistance wire placed therein for heating purposes, which consists in maintaining such wire in an expanded condition at a temperature greater than that of molten glass by the introduction of electricity therein, while molten glass is poured around such wire and allowed to harden.

In witness whereof, I hereby subscribe my name this 19th day of December, 1928.

FRED H. ROWE.